United States Patent
Karlsson (10) Patent No.: US 11,097,678 B2
(45) Date of Patent: Aug. 24, 2021

(54) AUTOMOTIVE SIDE RAIL CRUSH CAN FASTENING ASSEMBLY

(71) Applicant: Volvo Car Corporation, Gothenburg (SE)

(72) Inventor: Daniel Karlsson, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 90 days.

(21) Appl. No.: 16/548,912

(22) Filed: Aug. 23, 2019

(65) Prior Publication Data

US 2021/0053518 A1 Feb. 25, 2021

(51) Int. Cl.
*B60R 19/34* (2006.01)
*B60R 19/24* (2006.01)

(52) U.S. Cl.
CPC ........ *B60R 19/34* (2013.01); *B60R 2019/242* (2013.01); *B60R 2019/247* (2013.01)

(58) Field of Classification Search
CPC .......................... B60R 2019/242; B60R 19/34
USPC .......................... 296/132, 133; 293/132, 133
See application file for complete search history.

(56) References Cited

U.S. PATENT DOCUMENTS

| | | | |
|---|---|---|---|
| 7,793,997 | B2 | 9/2010 | Karlander |
| 9,199,592 | B1 | 12/2015 | Nusier et al. |
| 9,254,800 | B2 | 2/2016 | Nilsson |
| 2006/0249962 | A1 | 11/2006 | Gonzalez et al. |
| 2009/0261602 | A1 | 10/2009 | Karlander |
| 2014/0062106 | A1 | 3/2014 | Han |
| 2016/0121829 | A1 * | 5/2016 | Murata ............ B62D 25/08 293/133 |
| 2018/0170294 | A1 | 6/2018 | Hashimoto et al. |
| 2019/0152413 | A1 * | 5/2019 | Renegar ............ B60R 19/00 |

FOREIGN PATENT DOCUMENTS

| | | | | |
|---|---|---|---|---|
| DE | 102005021663 B3 | | 5/2006 | |
| EP | 2202118 A1 | | 6/2010 | |
| EP | 2786836 A1 * | | 10/2014 | ............ F16F 7/12 |
| JP | 2009120098 A * | | 6/2009 | ............ B60R 19/04 |
| WO | WO-2004113131 A1 * | | 12/2004 | ............ B60R 19/34 |
| WO | WO-2016148635 A1 * | | 9/2016 | ............ B60R 19/34 |

OTHER PUBLICATIONS

Oct. 14, 2020 European Search Report issued on International Application No. 20191554.

* cited by examiner

*Primary Examiner* — Jason S Morrow
*Assistant Examiner* — Kevin P Weldon
(74) *Attorney, Agent, or Firm* — Clements Bernard Walker; Christopher L. Bernard (57) ABSTRACT

A vehicle crush can adapted to couple a bumper beam to a side rail, including: a hollow box structure including front and rear portions, the front portion including or adapted to be coupled to a bracket assembly adapted to be coupled to the bumper beam, the rear portion adapted to be disposed within the side rail and defining a plurality of lateral holes; and one or more internal sleeves disposed within the box structure and defining a plurality of lateral channels aligned with the plurality of lateral holes of the box structure; the plurality of lateral holes of the box structure and the plurality of lateral channels of the one or more internal sleeves adapted to be aligned with a plurality of holes defined by the side rail when the rear portion of the box structure is disposed within the side rail and collectively receive a plurality of bolts therethrough.

20 Claims, 5 Drawing Sheets

AUTOMOTIVE SIDE RAIL CRUSH CAN FASTENING ASSEMBLY

TECHNICAL FIELD

The present disclosure relates generally to the automotive field. More particularly, the present disclosure relates to an automotive side rail crush can fastening assembly for coupling a bumper beam and crush can to a side rail or other longitudinal rail of a vehicle.

BACKGROUND

There are several difficult load cases to deal with in automotive engineering, but the offset-deformable barrier (ODB) crash is one of the most difficult, combining asymmetrical loads and high energy levels. More often than not, the problem is not on the struck side of the vehicle, but rather on non-struck side of the vehicle. The explanation for this is quite simple; one-sided deformation of the vehicle structure (i.e., the crush can (or crash box) and the side rail) forces the attached bumper beam backwards on struck side, which in turn results in a pulling force on the crush can on the non-struck side. The resulting bending moment must be absorbed by the outboard side of the crush can on the non-struck side. By extension, it follows that an important aspect of improved ODB performance comes down to a well-thought out connection setup between the crush cans and the and side rails, to avoid the bumper system from being ripped out. More to the point, this connection setup must be able to distribute both axial loads and bending moments in an effective manner.

A well-known concept within the automotive industry for front bumper system designs is the insertion-type attachment, where the crush cans are inserted into the front side rails (in the longitudinal direction) and then subsequently bolted in place, offering benefits such as low weight and reduced cost. There are, however, significant drawbacks to this insertion-type attachment, especially with respect to the ODB load case. To attach insertion-type crush cans to the side rails, the crush cans generally have some sort of sleeve design in the interior rear portion, the main purpose of which is to provide clamping force around the through-bolts used for durability and safety reasons. Most often, these internal sleeves are mechanically fixed to the associated crush can via clinching or some sort of simple thermal bonding, just to hold the sleeves in place until the bolts are secured. This design approach overlooks two very critical aspects.

By not rigidly connecting the internal sleeves to the crush cans (on a microscopic level), the fundamental design challenge boils down to coping with high hole edge-pressures to avoid the bumper system from being ripped out of side rails. Due to the high energies involved, this is extremely difficult, and the outcome is, unfortunately, a bumper system that ultimately detaches on the non-struck side of the vehicle, with the sleeves and bolts tearing through and away from the associated crush can. Of course, such a structural collapse has huge negative impacts, leaving the vehicle vulnerable to uncontrolled runaway intrusion, with potentially severe implications for vehicle occupants.

By not recognizing the importance of internal sleeve design and connection, a considerable amount of material is underutilized, in this case translating into lower performance than what could otherwise be achieved. Or, seen from another angle, to reach the same level of performance as the present disclosure, more material would have to be added in in a more complex setup, or, in a worst case scenario, resorting to general up-gaging—which drives higher weight and cost. This is generally unwanted from business and environmental points of view.

Another common approach besides the insertion-type bumper system is the so-called X-mounted type (X-type, in short). As the name indicates, the bumper system is mounted and assembled in the vehicle's x-direction (i.e., longitudinal direction) versus the side rails, made possible by introducing back plates—one in rear portion of the crush can and one in the front portion of the associated side rail—through which the bumper back plate is bolted to the associated side rail front plate, thereby completing the connection. The advantage of such a setup is improved ODB performance since the load on the non-struck side is carried by axial forces in the bolts, and not through hole edge-pressures, as in the insertion-type setup. The main disadvantage of this design is that it increases weight and cost, since two new relatively large components are needed for setting up the connection interface in the longitudinal direction. It is therefore beneficial to find an improved insertion-type design, to keep down weight and cost, while matching or exceeding the performance level of the X-type connection, for passenger safety reasons.

Finally, as every automotive engineer is keenly aware of (often painfully so) it is of great importance to consider structures and systems in a broader picture. On this front, the present disclosure provides several important advantages.

The primary function of the present disclosure is to avoid separation between a crush can and a side rail, especially in an ODB crash. The intended design balancing is to shift the weak link to the interface between the crush can and the bumper beam. The logical reasoning behind this is to remove the complex behavior of fracture mechanics involved with a ripped-out crush can, and achieve a simpler scenario involving a heavily bent bumper beam that can be more easily predicted in computer simulation and tuned during the physical verification stage.

One could argue that there is little chance that a bumper beam could stay connected to crush can if one were to allow no deformation and partial disconnection, due to the high load applied to the entire system in an ODB event. The logical solution is to implement a design that allows for large angle change of the bumper beam, while also being able to withstand high load levels to keep the structural connection from side to side intact. Thus, the present disclosure provides a comprehensive and overarching strategy to improve overall ODB performance, while keeping weight and cost low.

SUMMARY

The present disclosure enhances vehicle safety, especially in an ODB crash where an incoming object only impacts one side of the vehicle at high speed, hence only triggering one set of side rails (the side rails being the main component for absorbing energy in a high-speed frontal collision). Since only side of the vehicle's energy absorbing structure is engaged, it follows that stress becomes heavily skewed on a global vehicle level, which requires careful and purposeful design to avoid frontal system collapse and the loss of structural integrity.

To increase passenger safety in an ODB crash, where an incoming object only has partial overlap with the vehicle and largely engages just one side of the vehicle's energy absorbing structure (through triggering bend lines or the axial crush mode of a front side rail), the present disclosure focuses on improving the connection between the front bumper system and the side rails to avoid the rip-out of the bumper system on a non-struck side of the vehicle. The present disclosure moves away from the common strategy of relying on crush cans having to resist large amounts of hole edge-pressure, often leading to considerable up-gaging or significant re-design attempts or efforts. Instead, the present disclosure distributes the loads involved onto a substantial portion of the crush can side wall, thus reducing the overall stress levels by introducing large shear planes, realized in the form of internal sleeves thermally bonded to each crush can (or crash box). This approach takes hole edge-pressure out of the equation, opting instead for maximizing the area over which load is distributed (hence brining down stress level), Optimized thermal bonding is utilized, including friction-stir welding (FSW), reducing failure triggering points.

In one exemplary embodiment, the present disclosure provides a bumper assembly for a vehicle, the bumper assembly including: a pair of longitudinally-disposed side rails, wherein each of the pair of side rails includes an outboard portion and an inboard portion; a laterally-disposed bumper beam coupled to and between the pair of side rails; and a pair of crush cans disposed between the bumper beam and the side rails; wherein each of the pair of crush cans includes: a box structure including a front portion and a rear portion and defining a longitudinal axis, wherein the front portion of the box structure includes or is adapted to be coupled to a bracket assembly that is adapted to be coupled to the bumper beam, wherein the rear portion of the box structure is adapted to be disposed within the associated side rail, and wherein the rear portion of the box structure defines a plurality of lateral holes; and one or more internal sleeves disposed within and coupled to the box structure, wherein the one or more internal sleeves define a plurality of lateral channels that are aligned with the plurality of lateral holes of the rear portion of the box structure; wherein the plurality of lateral holes of the rear portion of each box structure and the plurality of lateral channels of the associated one or more internal sleeves are adapted to be aligned with a plurality of holes defined by the outboard portion and the inboard portion of the associated side rail when the rear portion of the box structure is disposed within the side rail and collectively receive a plurality of bolts therethrough. The one or more internal sleeves are thermally bonded to interior surfaces of lateral walls of the associated box structure. Optionally, the one or more internal sleeves are friction-stir welded to the interior surfaces of the lateral walls of the box structure. Optionally, the rear portion of each box structure, the associated one or more internal sleeves, and the outboard portion and the inboard portion of the associated side rail define a pair of upper holes/channels and a pair of lower holes/channels. Optionally, each pair of upper channels is defined by a common upper internal sleeve and each pair of lower channels is defined by a common lower internal sleeve.

In another exemplary embodiment, the present disclosure provides a vehicle, including: a pair of longitudinally-disposed side rails, wherein each of the pair of side rails includes an outboard portion and an inboard portion; a laterally-disposed bumper beam coupled to and between the pair of side rails; and a pair of crush cans disposed between the bumper beam and the side rails; wherein each of the pair of crush cans includes: a box structure including a front portion and a rear portion and defining a longitudinal axis, wherein the front portion of the box structure includes or is adapted to be coupled to a bracket assembly that is adapted to be coupled to the bumper beam, wherein the rear portion of the box structure is adapted to be disposed within the associated side rail, and wherein the rear portion of the box structure defines a plurality of lateral holes; and one or more internal sleeves disposed within and coupled to the box structure, wherein the one or more internal sleeves define a plurality of lateral channels that are aligned with the plurality of lateral holes of the rear portion of the box structure; wherein the plurality of lateral holes of the rear portion of each box structure and the plurality of lateral channels of the associated one or more internal sleeves are adapted to be aligned with a plurality of holes defined by the outboard portion and the inboard portion of the associated side rail when the rear portion of the box structure is disposed within the side rail and collectively receive a plurality of bolts therethrough. The one or more internal sleeves are thermally bonded to interior surfaces of lateral walls of the associated box structure. Optionally, the one or more internal sleeves are friction-stir welded to the interior surfaces of the lateral walls of the box structure. Optionally, the rear portion of each box structure, the associated one or more internal sleeves, and the outboard portion and the inboard portion of the associated side rail define a pair of upper holes/channels and a pair of lower holes/channels. Optionally, each pair of upper channels is defined by a common upper internal sleeve and each pair of lower channels is defined by a common lower internal sleeve.

In a further exemplary embodiment, the present disclosure provides a crush can adapted to couple a laterally-disposed bumper beam of a vehicle to a longitudinally-disposed side rail of the vehicle, the crush can including: a hollow box structure including a front portion and a rear portion and defining a longitudinal axis, wherein the front portion of the box structure includes or is adapted to be coupled to a bracket assembly that is adapted to be coupled to the bumper beam, wherein the rear portion of the box structure is adapted to be disposed between an outboard portion and an inboard portion of the side rail, and wherein the rear portion of the box structure defines a plurality of lateral holes; and one or more internal sleeves disposed within and coupled to the box structure, wherein the one or more internal sleeves define a plurality of lateral channels that are aligned with the plurality of lateral holes of the rear portion of the box structure; wherein the plurality of lateral holes of the rear portion of the box structure and the plurality of lateral channels of the one or more internal sleeves are adapted to be aligned with a plurality of holes defined by the outboard portion and the inboard portion of the side rail when the rear portion of the box structure is disposed between the outboard portion and the inboard portion of the side rail and collectively receive a plurality of bolts therethrough. The one or more internal sleeves are thermally bonded to interior surfaces of lateral walls of the box structure. Optionally, the one or more internal sleeves are friction-stir welded to the interior surfaces of the lateral walls of the box structure. Optionally, the rear portion of the box structure, the one or more internal sleeves, and the outboard portion and the inboard portion of the side rail define a pair of upper holes/channels and a pair of lower holes/channels. Optionally, each pair of upper channels is defined by a common upper internal sleeve and each pair of lower channels is defined by a common lower internal sleeve. Preferably, the box structure and the one or more internal sleeves are manufactured from extruded aluminum. The one or more internal sleeves are friction-stir welded to the interior surfaces of the lateral walls of the box structure around a periphery of each end of the associated internal sleeve.

BRIEF DESCRIPTION OF THE DRAWINGS

The present disclosure is illustrated and described herein with reference to the various drawings, in which like reference numbers are used to denote like assembly components/ method steps, as appropriate, and in which.

DESCRIPTION OF EMBODIMENTS

Again, the present disclosure enhances vehicle safety, especially in an ODB crash where an incoming object only impacts one side of the vehicle at high speed, hence only triggering one set of side rails (the side rails being the main component for absorbing energy in a high-speed frontal collision). Since only side of the vehicle's energy absorbing structure is engaged, it follows that stress becomes heavily skewed on a global vehicle level, which requires careful and purposeful design to avoid frontal system collapse and the loss of structural integrity.

To increase passenger safety in an ODB crash, where an incoming object only has partial overlap with the vehicle and largely engages just one side of the vehicle's energy absorbing structure (through triggering bend lines or the axial crush mode of a front side rail), the present disclosure focuses on improving the connection between the front bumper system and the side rails to avoid the rip-out of the bumper system on a non-struck side of the vehicle. The present disclosure moves away from the common strategy of relying on crush cans having to resist large amounts of hole edge-pressure, often leading considerable up-gaging or significant re-design requirements. Instead, the present disclosure distributes the loads involved onto a substantial portion of the crush can side wall, thus reducing the overall stress levels by introducing large shear planes, realized in the form of internal sleeves thermally bonded to each crush can (or crash box). This approach takes hole edge-pressure out of the equation, opting instead for maximizing the area over which load is distributed (hence brining down stress level), Optimized thermal bonding is utilized, including FSW, reducing failure triggering points.

Figure 1:
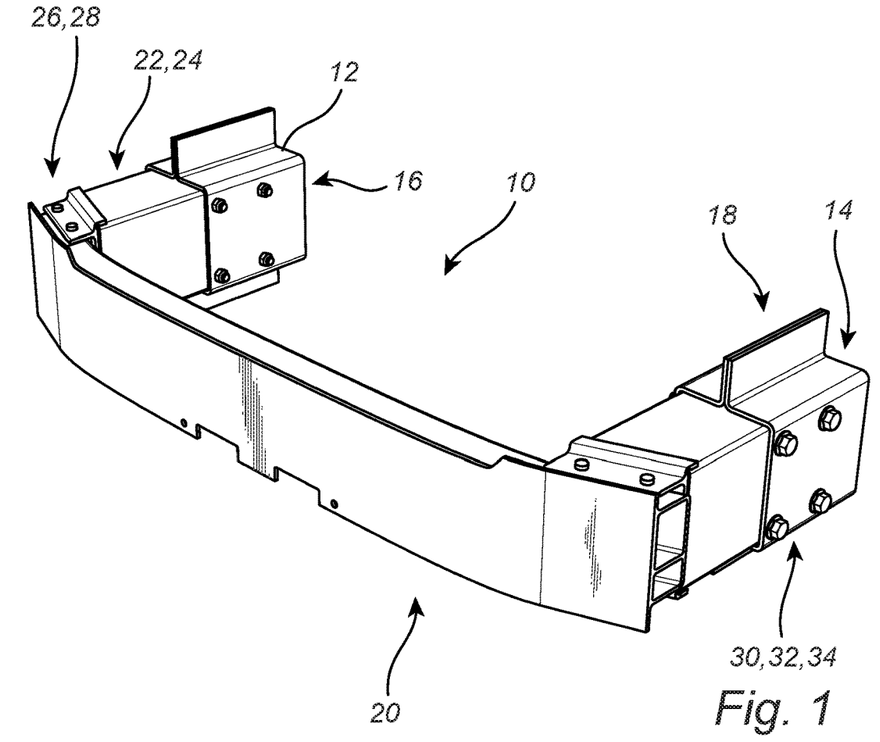
FIG. 1 is a perspective view of one exemplary embodiment of a vehicle bumper beam, crush can, and side rail assembly utilizing the crush can-side rail fastening assembly of the present disclosure.

Referring now specifically to FIG. 1, the bumper assembly 10 of the present disclosure is disposed at the front (or rear) end of a vehicle and includes a pair of longitudinally-disposed side rails 12 (and/or other longitudinally-disposed rails), well known to persons of ordinary skill in the art. Each of the pair of side rails 12 includes an outboard portion 14 and an inboard portion 16 that are bolted and/or welded or otherwise joined together to form a box-like, prismatic rail structure that defines an interior volume that is open on at least one end. The outboard portion 14 and the inboard portion 16 of each side rail 12 are joined together along an upper and lower flange 18 in the exemplary embodiment illustrated. A laterally-disposed bumper beam 20, also well known to persons of ordinary skill in the art, is coupled to and between the pair of side rails 12 at the open ends thereof. This bumper beam 20 may consist of a single component or multiple components and provides the structural member to which a finished bumper on the exterior of the vehicle body is attached. It is this bumper beam 20 that is primarily (first) impacted during an ODB crash event. The side rails 12 and bumper beam 20 may be manufactured from extruded or stamped aluminum or another metallic material providing sufficient structural integrity while conserving weight to the extent possible.

A pair of crush cans (or crash boxes) 22 are disposed between the bumper beam 20 and the side rails 12, with one crush can 22 disposed on each side of the vehicle and associated with each side rail 12. Each of the pair of crush cans 22 includes a box structure 24 including a front portion and a rear portion and defining a longitudinal axis therethrough that is aligned with the longitudinal axis of the associated side rail 12. The front portion of the box structure 24 includes or is adapted to be coupled to a bracket assembly 26 that is adapted to be coupled to one end of the bumper beam 20 using bolts 28 and/or welds, for example. The rear portion of the box structure 24 is adapted to be disposed within the associated side rail 12, passing through the open end thereof and into the interior volume of the side rail 12. The rear portion of the box structure 24 defines a plurality of lateral holes 30. The plurality of lateral holes 30 of the rear portion of the box structure 24 are adapted to be aligned with a plurality of holes 32 defined by the outboard portion 14 and the inboard portion 16 of the associated side rail 12 when the rear portion of the box structure 24 is disposed within the side rail 12 and these holes 30,32 collectively receive a plurality of bolts 34 therethrough. This nesting configuration and these bolts 34 secure the crush can 22 in longitudinal alignment with the associated side rail 12, at a predetermined penetration depth, preventing relative movement of the crush can 22 with respect to the side rail 12, while providing a lightweight, assemble-able construct.

In the exemplary embodiment illustrated, upper and lower pairs of holes 30,32 and bolts 34 (as well as corresponding nuts) are used to secure the crush can 22 within and to the associated side rail 12. It will be readily apparent to those of ordinary skill in the art that other numbers and configurations of holes 30,32 and bolts 34 could be used equally.

Although not specifically illustrated in FIG. 1, as described in greater detail herein below, one or more internal sleeves are disposed within the interior of the box structure 24. The one or more internal sleeves define a plurality of lateral channels that are aligned with the plurality of lateral holes 30 of the rear portion of the box structure 24, and the plurality of lateral holes 30 of the rear portion of the box structure 24 and the plurality of lateral channels of the one or more internal sleeves are adapted to be aligned with the plurality of holes 32 defined by the outboard portion 14 and the inboard portion 16 of the associated side rail 12 when the rear portion of the box structure 24 is disposed within the side rail 12. These holes 30,32 and channels collectively receive the plurality of bolts 34 therethrough. Thus, the various channels individually or collectively surround the various bolts 34. This provides added structural integrity to the assembly 10. The crush cans 22 and internal sleeves may be manufactured from extruded or stamped aluminum or another metallic material providing sufficient structural integrity while again conserving weight to the extent possible.

Preferably, the one or more internal sleeves are thermally bonded to the opposed interior surfaces of the lateral walls of the associated box structure 24. Optionally, the one or more internal sleeves are friction-stir welded around their periphery/peripheries to the opposed interior surfaces of the lateral walls of the box structure 24. Again, this provides enhanced structural integrity. Again, the rear portion of each box structure 24, the associated one or more internal sleeves, and the outboard portion 14 and the inboard portion 16 of the associated side rail 12 define a pair of upper holes/channels and a pair of lower holes/channels. Optionally, each pair of upper channels is defined by a common upper internal sleeve and each pair of lower channels is defined by a common lower internal sleeve.

Figure 2:
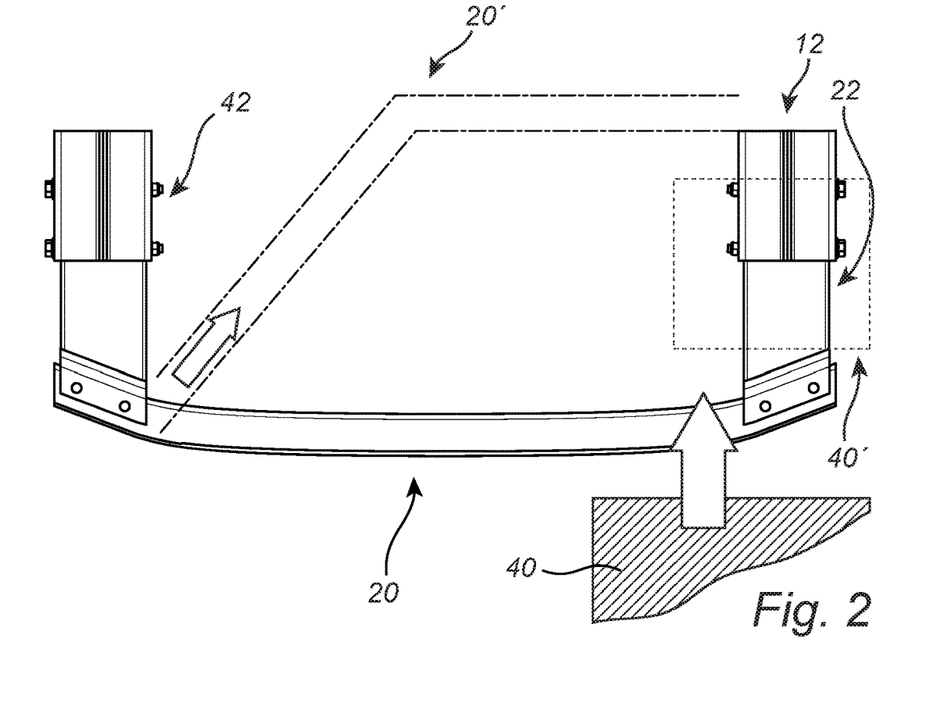
FIG. 2 is a planar view illustrating the forces and loads experienced by a vehicle bumper beam, crush can, and side rail assembly utilizing the crush can-side rail fastening assembly of the present disclosure in the event of an ODB crash.

Referring now specifically to FIG. 2, the effect of an ODB impact on the bumper beam 20 and associated structures is illustrated. When the object 40 strikes one end of the bumper beam 20, that end is driven into the vehicle until the object 20' comes to its resting position, crushing the crush can 22 and side rail 12 on that side of the vehicle longitudinally into the vehicle. This effectively provides a pulling force and a torque on the other end of the bumper beam 20 through the bumper beam 20. The crush can 22 at the other end of the bumper beam 20 is thereby pulled longitudinally forward with respect to the associated side rail 12, potentially tearing this crush can 22 from this side rail 12, but for the crush can assembly of the present disclosure. Here, the welds 42 that secure the internal sleeves within the crush cans 22 can be seen. Preventing rotational and longitudinal detachment of the crush can 22 from the associated side rail 12 here limits disengagement of vehicle components, maintains as much vehicle structural integrity as possible, and limits the potential for vehicle occupant and third party injury. In other words, crash worthiness is significantly enhanced.

Figure 3:
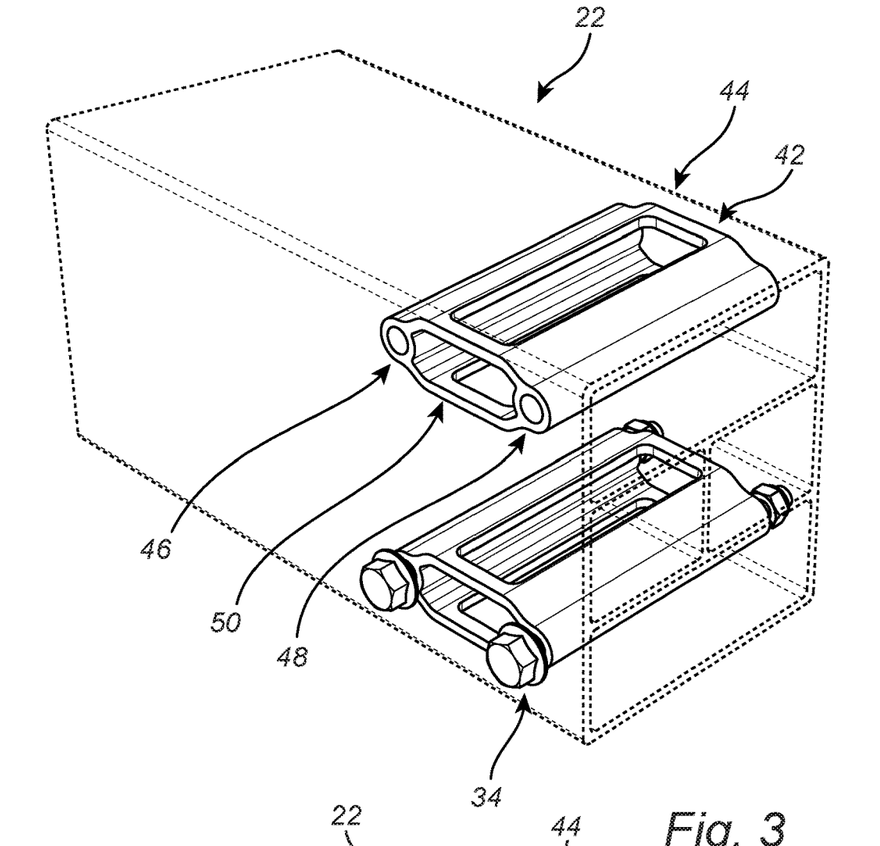
FIG. 3 is a perspective view of one exemplary embodiment of the crush can (or crash box) of the present disclosure utilizing a plurality of thermally-bonded internal sleeves.

Referring now specifically to FIG. 3, a pair of internal sleeves 44, each encompassing an adjacent pair of channels 46, upper and lower, are disposed and secured within the associated crush can 22. Each of the channels 46 is formed by a cylindrical bore structure 48 that traverses the interior of the crush can 22 laterally. Adjacent cylindrical bore structures 48 are joined via one or more spanning members 50, although other suitable configurations can be utilized equally. Again, the crush cans 22 and internal sleeves 44 may be manufactured from extruded or stamped aluminum or another metallic material providing sufficient structural integrity while conserving weight to the extent possible. As illustrated, end welds 42 are used to secure the internal sleeves 44 within the associated crush can 22. Arc welding in aluminum has several drawbacks. First, it provides a zonal connection and its mechanical performance is heavily influenced by e.g. penetration depth and general adhesion characteristics to a base material. These parameters tend to require significant tuning and service during production to maintain quality. As a consequence, virtual verification of the product in a computer-aided engineering (CAE) environment is complex. Second, a base material is affected by the heat input from the process, lowering its mechanical performance, and subsequent heat treatment is typically needed bring the properties up again, for both the base material and the weld. FSW, on the other hand, provides the desired structural integrity alone and immediately. The channels 46 are configured to receive the aforementioned bolts 34 (and nuts) that secure the crush can 22 to the associated side rail 12 (FIGS. 1 and 2) after the rear portion of the crush can 22 is inserted into the open end of the side rail 12. It is also contemplated that the crush cans 22 could be disposed outside of and about the end portions of the side rails 12, if so desired.

Figure 4:
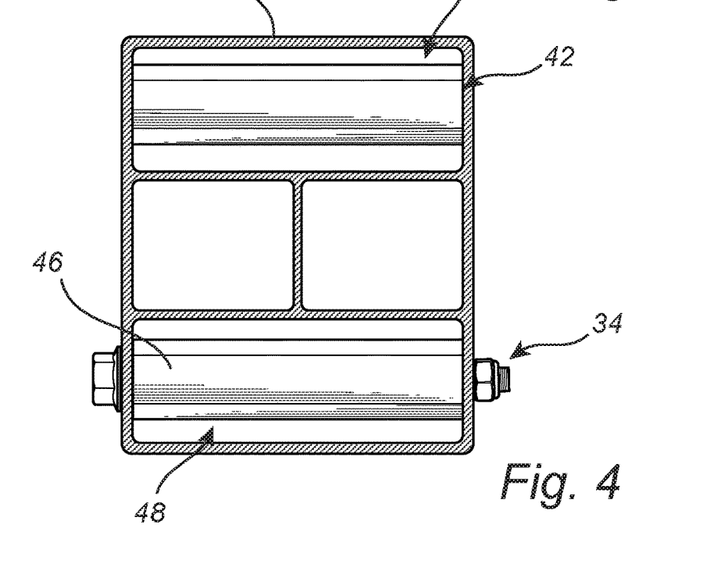
FIG. 4 is a planar view of one exemplary embodiment of the crush can (or crash box) of the present disclosure utilizing a plurality of thermally-bonded internal sleeves.

Similarly, FIG. 4 illustrates the pair of internal sleeves 44, each encompassing an adjacent pair of channels 46, upper and lower, disposed and secured within the associated crush can 22. Each of the channels 46 is formed by a cylindrical bore structure 48 that traverses the interior of the crush can 22 laterally. Adjacent cylindrical bore structures 48 are joined via one or more spanning members 50 (FIG. 3), although other suitable configurations can be utilized equally. Again, the crush cans 22 and internal sleeves 44 may be manufactured from extruded or stamped aluminum or another metallic material providing sufficient structural integrity while conserving weight to the extent possible. As illustrated, end welds 42 are used to secure the internal sleeves 44 within the associated crush can 22. Arc welding does not work well with aluminum structures, in general, as it provides a zonal connection and typically requires subsequent heat treatment. FSW, on the other hand, provides the desired structural integrity alone and immediately. The channels 46 are configured to receive the aforementioned bolts 34 (and nuts) that secure the crush can 22 to the associated side rail 12 (FIGS. 1 and 2) after the rear portion of the crush can 22 is inserted into the open end of the side rail 12. It is also contemplated that the crush cans 22 could be disposed outside of and about the end portions of the side rails 12, if so desired.

Figure 5:
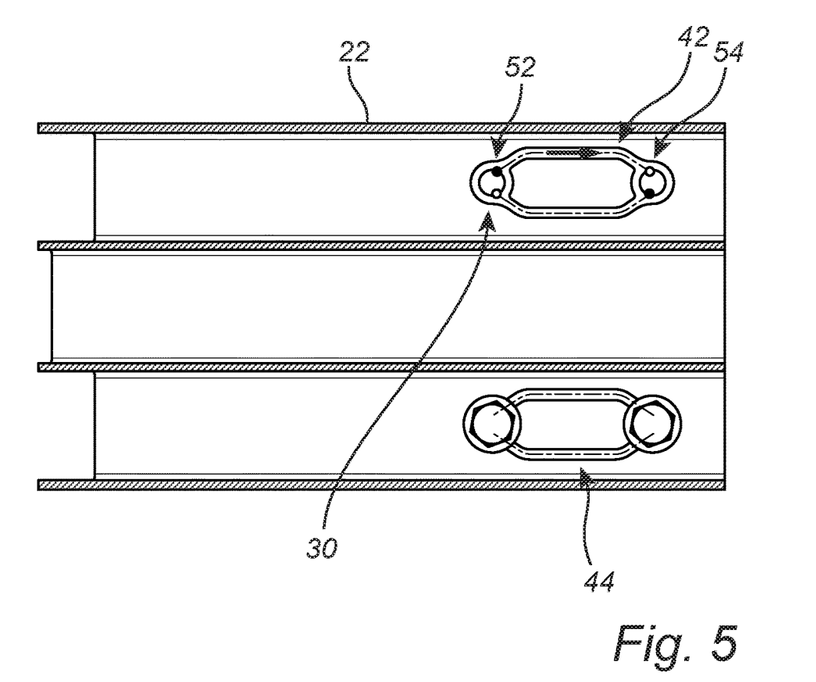
FIG. 5 is another planar view of one exemplary embodiment of the crush can (or crash box) of the present disclosure utilizing a plurality of thermally-bonded internal sleeves, highlighting the use of one exemplary FSW pattern.

Referring now specifically to FIG. 5, in one exemplary embodiment, when utilizing adjacent pairs of upper and lower holes 30, for each internal sleeve 44, the FSW 42 is started at the front-upper portion of the internal sleeve periphery 52, adjacent to the front hole 30. The FSW 42 proceeds to the rear-upper portion of the internal sleeve periphery 54, adjacent to the rear hole 30, and ends there. The FSW 42 is then started at the rear-lower portion of the internal sleeve periphery 52, adjacent to the rear hole 30. The FSW 42 proceeds to the front-lower portion of the internal sleeve periphery 54, adjacent to the front hole 30, and ends there. The circular motion utilized in this exemplary embodiment minimizes tool adjustment and realignment motion, thereby reducing process time and cost.

Figure 6:
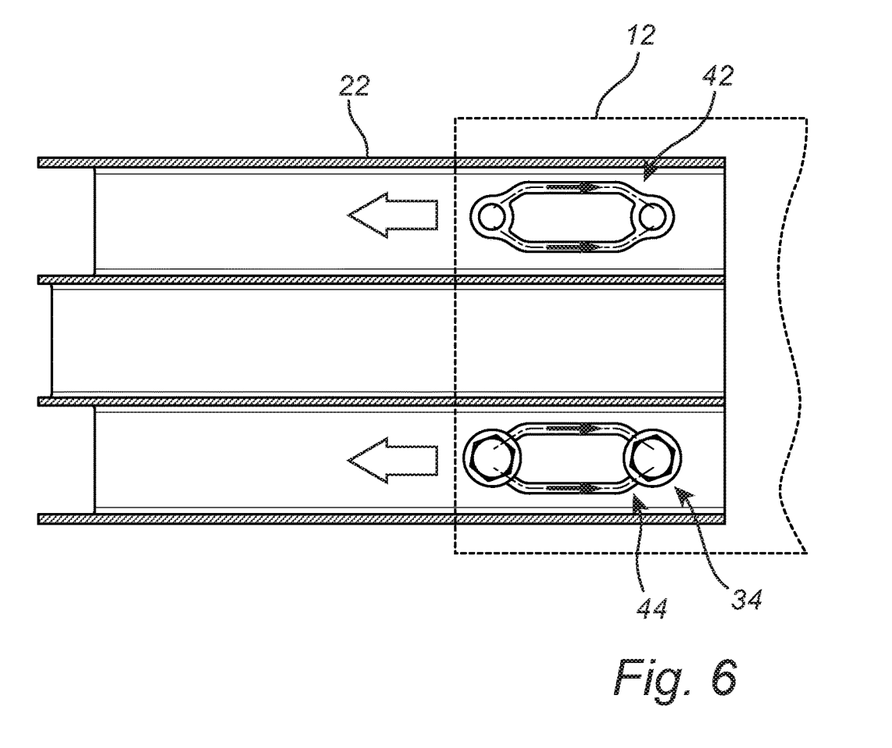
FIG. 6 is another planar view illustrating the forces and loads experienced by a crush can and side rail assembly utilizing the crush can-side rail fastening assembly of the present disclosure in the event of an ODB crash, highlighting the forces and loads applied to the through bolts and FSWs utilized.

Referring now specifically to FIG. 6, in the event of an ODB crash, the crush can 22 on the non-struck side of the vehicle experiences a pull-out force, as indicated by the arrows, due to the rotational forces created in the front of the vehicle. This creates a reactionary force along the FSWs 42. This occurs after the pull-out force is high enough to overcome the bolt clamp force holding the crush can 22 and the side rail 12 together, when slippage occurs. This slippage occurs suddenly and is very brief, and stops when the bolt 34 contacts the internal sleeve 44. When this happens, the pull-out force is distributed along the FSW 42. Thus, the loads experienced are transferred from the side rail 12, through the bolts 34, and onto the larger portion of the lateral walls of the crush can 22 via the internal sleeves 44, and vice versa.

Figure 7:
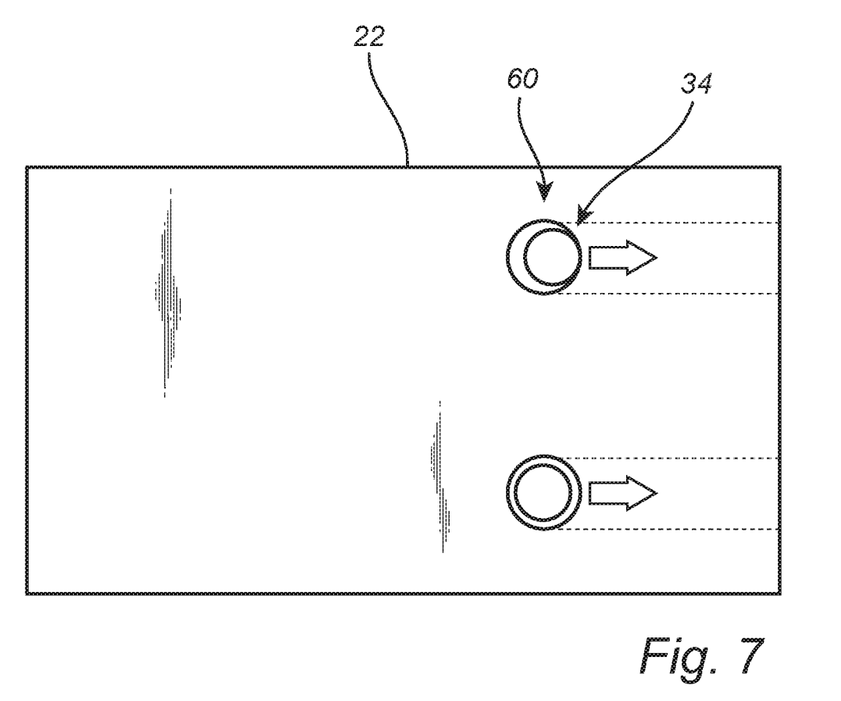
FIG. 7 is a further planar view illustrating the forces and loads experienced by a crush can and side rail assembly utilizing a conventional crush can-side rail fastening assembly in the event of an ODB crash, highlighting the forces and loads applied to the through bolts associated holes utilized.

FIG. 7 illustrates a conventional setup, in which, after clamping force slippage, the bolts 34 freely contact the edges of the holes 60 formed in the sides of the crush can 22 (and the sides of the associated side rail), absent the presence of any internal sleeves or internal sleeves that are thermally bonded to the interior lateral walls of the crush can 22. Thus, no pressure is transferred to the interior lateral walls of the crash can 22. This creates concentrated load points at the edges of the holes 60. The result is that fracture or ripping of the crush can 22 at the holes 60 is likely to occur under sufficient loads and the crush can 22 may completely detach from the side rail.

Figure 8:
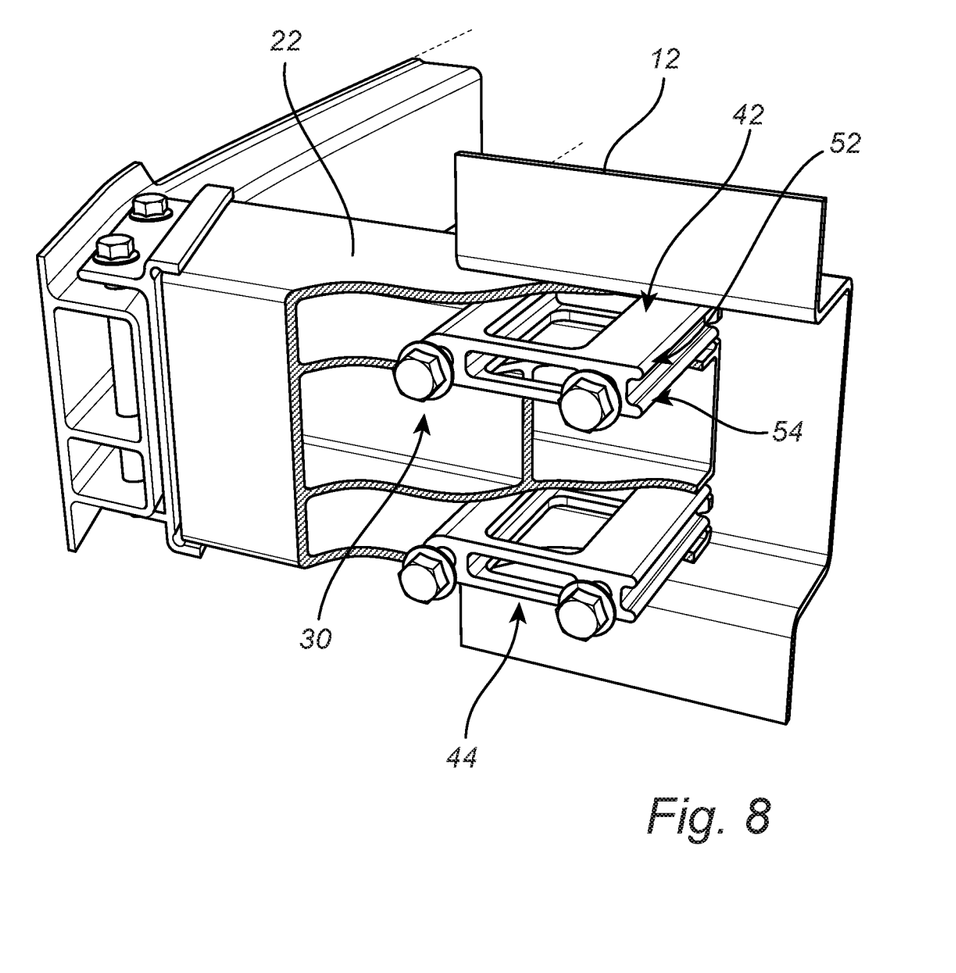
FIG. 8 is a perspective view of one exemplary embodiment of the crush can (or crash box) of the present disclosure utilizing a plurality of thermally-bonded internal sleeves, highlighting the use of another exemplary FSW pattern.

Referring now specifically to FIG. 8, in another exemplary embodiment, when utilizing adjacent pairs of upper and lower holes 30, for each internal sleeve 44, the FSW 42 is started at the rear-upper portion of the internal sleeve periphery 52, adjacent to the rear hole 30. The FSW 42 proceeds around the front hole 30 to the rear-lower portion of the internal sleeve periphery 54, adjacent to the rear hole 30, and ends there. Thus, by careful design, the present disclosure eliminates the otherwise common weak points that arise in start and end points when utilizing traditional thermal bonding techniques. Arc welding produces an uneven weld cross section in starts and finishes, and in similar fashion FSW will produce a tooling indentations. Consequently, one is potentially left with a largely non-homogenous connection with obvious trigger points in starts and finishes, thereby compromising the structural integrity. The present disclosure arranges process start and finish points in such a manner that they are not included in the finished product, essentially, hence are not able to act as triggers, and consequently adding performance and achieving the overall goal of decreasing the risk of disconnected crush cans and side rails. This is accomplished by placing FSW start and end points in the rearmost portion of each crush can. Via computer-numerical control (CNC) machining, the start and end points can essentially be removed from the loaded structure, leaving only a homogenous thermal connection.

Thus, the present disclosure provides a vehicle incorporating a set of front side rails (or longitudinal rails) arranged fairly evenly across the vehicle. A front bumper system coupled to the front of the vehicle includes a set of crush cans (also known as crash boxes) also arranged in the longitudinal direction are lined up spatially with the side rails. The bumper system includes a bumper beam, located in front of crush cans, and extending in a lateral direction to create a side-to-side span structure. The front portion of each crush can includes an attachment interface so as to connect the bumper beam, and the outer end portion of the bumper beam similarly incorporating a connecting interface so as to attach to the crush cans, thereby completing the side-to-side span structure. Each side rail includes an inner and an outer panel, creating a hollow interior section in the longitudinal direction, allowing for the insertion of a pair of crush cans, and, in extension, the front bumper system. The front end portion of each side rail further includes a number of holes arranged geometrically so that one hole on the outer panel has a corresponding hole on the inner panel and vice versa. The rear end of each of the crush cans also incorporates such a hole arrangement, so as to allow the mounting of each crush can to the associated side rail with a through bolt and nut, in the lateral direction. A set of internal sleeves are located in the rear portion of each crush can and serve to surround the bolts. The crush cans are made of extruded aluminum or the like, as are the internal sleeves. The sleeves are mechanically bonded to the crush cans by means of FSW or a similar thermal bonding technique. The intent of the thermal bonding is to transfer loads from the beam to the side rail via the bolt connection of the crush can to the side rail, creating a common shear plane between the inserted sleeve and the associated crush can to withstand applied external forces and transfer loads to side rails.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A bumper assembly for a vehicle, the bumper assembly comprising:
   a pair of longitudinally-disposed side rails, wherein each of the pair of side rails comprises an outboard portion and an inboard portion;
   a laterally-disposed bumper beam coupled to and between the pair of side rails; and
   a pair of crush cans disposed between the bumper beam and the side rails;
   wherein each of the pair of crush cans comprises:
      a box structure comprising a front portion and a rear portion and defining a longitudinal axis, wherein the front portion of the box structure comprises or is adapted to be coupled to a bracket assembly that is adapted to be coupled to the bumper beam, wherein the rear portion of the box structure is adapted to be disposed within the associated side rail, and wherein the rear portion of the box structure defines a plurality of lateral holes; and
      one or more internal sleeves disposed around the plurality of lateral holes within and coupled to interior surfaces of lateral walls of the box structure, wherein the one or more internal sleeves define a plurality of lateral channels that are aligned with the plurality of lateral holes of the rear portion of the box structure;
   wherein the plurality of lateral holes of the rear portion of each box structure and the plurality of lateral channels of the associated one or more internal sleeves are adapted to be aligned with a plurality of holes defined by the outboard portion and the inboard portion of the associated side rail when the rear portion of the box structure is disposed within the side rail and collectively receive a plurality of bolts therethrough.

2. The bumper assembly of claim 1, wherein the one or more internal sleeves are thermally bonded to the interior surfaces of the lateral walls of the associated box structure.

3. The bumper assembly of claim 2, wherein the one or more internal sleeves are friction-stir welded to the interior surfaces of the lateral walls of the box structure to maximize load transfer area between the one or more internal sleeves and the interior surfaces of the lateral walls of the box structure.

4. The bumper assembly of claim 1, wherein the rear portion of each box structure, the coupled one or more internal sleeves, and the outboard portion and the inboard portion of the associated side rail define a pair of upper holes/channels and a pair of lower holes/channels.

5. The bumper assembly of claim 4, wherein each pair of upper channels is defined by a common upper internal sleeve and each pair of lower channels is defined by a common lower internal sleeve.

6. The bumper assembly of claim 1, wherein the one or more internal sleeves are coupled to the interior surfaces of the lateral walls of the box structure between adjacent lateral holes of the plurality of lateral holes.

7. A vehicle, comprising:
a pair of longitudinally-disposed side rails, wherein each of the pair of side rails comprises an outboard portion and an inboard portion;
a laterally-disposed bumper beam coupled to and between the pair of side rails; and
a pair of crush cans disposed between the bumper beam and the side rails;
wherein each of the pair of crush cans comprises:
a box structure comprising a front portion and a rear portion and defining a longitudinal axis, wherein the front portion of the box structure comprises or is adapted to be coupled to a bracket assembly that is adapted to be coupled to the bumper beam, wherein the rear portion of the box structure is adapted to be disposed within the associated side rail, and wherein the rear portion of the box structure defines a plurality of lateral holes; and
one or more internal sleeves disposed around the plurality of lateral holes within and coupled to interior surfaces of lateral walls of the box structure, wherein the one or more internal sleeves define a plurality of lateral channels that are aligned with the plurality of lateral holes of the rear portion of the box structure;
wherein the plurality of lateral holes of the rear portion of each box structure and the plurality of lateral channels of the associated one or more internal sleeves are adapted to be aligned with a plurality of holes defined by the outboard portion and the inboard portion of the associated side rail when the rear portion of the box structure is disposed within the side rail and collectively receive a plurality of bolts therethrough.

8. The vehicle of claim 7, wherein the one or more internal sleeves are thermally bonded to the interior surfaces of the lateral walls of the associated box structure.

9. The vehicle of claim 8, wherein the one or more internal sleeves are friction-stir welded to the interior surfaces of the lateral walls of the box structure to maximize load transfer area between the one or more internal sleeves and the interior surfaces of the lateral walls of the box structure.

10. The vehicle of claim 7, wherein the rear portion of each box structure, the coupled one or more internal sleeves, and the outboard portion and the inboard portion of the associated side rail define a pair of upper holes/channels and a pair of lower holes/channels.

11. The vehicle of claim 10, wherein each pair of upper channels is defined by a common upper internal sleeve and each pair of lower channels is defined by a common lower internal sleeve.

12. The vehicle of claim 7, wherein the one or more internal sleeves are coupled to the interior surfaces of the lateral walls of the box structure between adjacent lateral holes of the plurality of lateral holes.

13. A crush can adapted to couple a laterally-disposed bumper beam of a vehicle to a longitudinally-disposed side rail of the vehicle, the crush can comprising:
a hollow box structure comprising a front portion and a rear portion and defining a longitudinal axis, wherein the front portion of the box structure comprises or is adapted to be coupled to a bracket assembly that is adapted to be coupled to the bumper beam, wherein the rear portion of the box structure is adapted to be disposed between an outboard portion and an inboard portion of the side rail, and wherein the rear portion of the box structure defines a plurality of lateral holes; and
one or more internal sleeves disposed around the plurality of lateral holes within and coupled to interior surfaces of lateral walls of the box structure, wherein the one or more internal sleeves define a plurality of lateral channels that are aligned with the plurality of lateral holes of the rear portion of the box structure;
wherein the plurality of lateral holes of the rear portion of the box structure and the plurality of lateral channels of the one or more internal sleeves are adapted to be aligned with a plurality of holes defined by the outboard portion and the inboard portion of the side rail when the rear portion of the box structure is disposed between the outboard portion and the inboard portion of the side rail and collectively receive a plurality of bolts therethrough.

14. The crush can of claim 13, wherein the one or more internal sleeves are thermally bonded to the interior surfaces of the lateral walls of the box structure.

15. The crush can of claim 14, wherein the one or more internal sleeves are friction-stir welded to the interior surfaces of the lateral walls of the box structure to provide load transfer area between the one or more internal sleeves and the interior surfaces of the lateral walls of the box structure.

16. The crush can of claim 15, wherein the one or more internal sleeves are friction-stir welded to the interior surfaces of the lateral walls of the box structure around a periphery of each end of the associated internal sleeve.

17. The crush can of claim 13, wherein the rear portion of the box structure, the coupled one or more internal sleeves, and the outboard portion and the inboard portion of the side rail define a pair of upper holes/channels and a pair of lower holes/channels.

18. The crush can of claim 17, wherein each pair of upper channels is defined by a common upper internal sleeve and each pair of lower channels is defined by a common lower internal sleeve.

19. The crush can of claim 13, wherein the box structure and the one or more internal sleeves are manufactured from extruded aluminum.

20. The crush can of claim 13, wherein the one or more internal sleeves are coupled to the interior surfaces of the lateral walls of the box structure between adjacent lateral holes of the plurality of lateral holes.

* * * * *